(12) United States Patent
Munoz Ruiz

(10) Patent No.: US 9,557,078 B2
(45) Date of Patent: Jan. 31, 2017

(54) SOLAR HEATER FOR LIQUIDS

(71) Applicant: Fricaeco America SAPI DE C.V., San Pedro Garza Garcia (MX)

(72) Inventor: Andres Munoz Ruiz, Quintana Roo (MX)

(73) Assignee: FRICAECO AMERICA SAPI DE C.V., San Pedro Garza Garcia (MX)

( * ) Notice: Subject to any disclaimer, the term of this patent is extended or adjusted under 35 U.S.C. 154(b) by 777 days.

(21) Appl. No.: 13/963,592

(22) Filed: Aug. 9, 2013

(65) Prior Publication Data

US 2014/0083414 A1    Mar. 27, 2014

Related U.S. Application Data

(63) Continuation of application No. PCT/MX2011/000054, filed on May 12, 2011.

(30) Foreign Application Priority Data

Feb. 11, 2011  (MX) .................... MX/a/2011/002035

(51) Int. Cl.
  *F24J 2/10* (2006.01)
  *F24J 2/46* (2006.01)
  (Continued)

(52) U.S. Cl.
  CPC ................. *F24J 2/10* (2013.01); *F24H 1/202* (2013.01); *F24J 2/345* (2013.01); *F24J 2/46* (2013.01);
  (Continued)

(58) Field of Classification Search
  CPC ............... F24J 2/055; F24J 2/345; F24J 2/44; F24J 2/51; F24J 2/24; F24J 2/265; F24J 2/04; F24J 2/402; F24J 2/10; F24J 2/46; F24H 9/02; F24H 1/181; F24H 9/124; F24H 1/202; F28D 20/0039; F24D 11/003; F24D 2200/02; F24D 2200/14; F24D 2200/08; Y02E 10/40; Y02B 10/70; Y02B 10/20
  See application file for complete search history.

(56) References Cited

U.S. PATENT DOCUMENTS

| | | |
|---|---|---|
| 2,487,947 A | 11/1949 | Senn |
| 3,769,493 A | 10/1973 | Zeitlin et al. |
| | (Continued) | |

FOREIGN PATENT DOCUMENTS

| | | |
|---|---|---|
| CN | 202018141 U | 10/2011 |
| CN | 102650468 A | 8/2012 |
| | (Continued) | |

OTHER PUBLICATIONS

Mexican Patent Application No. Mx/a/2010/005129 filed Apr. 26, 2010, translation of Abstract included.
(Continued)

*Primary Examiner* — Jorge Pereiro
*Assistant Examiner* — Wes Anderson, Jr.
(74) *Attorney, Agent, or Firm* — Steven M. Koehler; Westman, Champlin & Koehler, P.A.

(57) ABSTRACT

This invention refers to an improved solar fluid heater with respect to the one submitted in patent application MX/a/2010/005129, which main improvement consist of a protective elastic membrane in the solar collector, allowing for the heating of any kind of liquid besides water, in which the solar collector design allows for the reception of solar radiation in its surface both, vertical and horizontal, wherein the horizontal surface heat is conveyed to the fluid through a central tubular axle with ribs, in which the air in the gap between the solar collector and the transparent cover has been replaced by argon, wherein the check valves have been (Continued)

designed with an anti-clogging system, that the cold and hot water supply system have been optimized and wherein the overpressure system is now powered by a photovoltaic panel built-in the solar heater object this invention. The purpose of this invention is to simplify and improve the design submitted in patent application MX/a/2010/005129, allowing for its commercialization at a more affordable price to the consumer than the current solar fluid heaters.

13 Claims, 12 Drawing Sheets

(51) Int. Cl.
  *F24H 1/20* (2006.01)
  *F24J 2/34* (2006.01)
(52) U.S. Cl.
  CPC ....... *F24D 2200/02* (2013.01); *F24D 2200/08* (2013.01); *F24D 2200/14* (2013.01); *Y02B 10/20* (2013.01); *Y02B 10/70* (2013.01); *Y02E 10/40* (2013.01)

(56) References Cited

U.S. PATENT DOCUMENTS

| | | | |
|---|---|---|---|
| 3,934,973 A | 1/1976 | Shultz | |
| 4,015,586 A | 4/1977 | Vroom et al. | |
| 4,051,890 A * | 10/1977 | Melchior | F24J 2/04 126/569 |
| 4,086,958 A * | 5/1978 | Lindner | F28C 3/00 126/400 |
| 4,294,310 A | 10/1981 | Reusch et al. | |
| 4,328,790 A | 5/1982 | Kircus | |
| 4,333,448 A * | 6/1982 | Johnson | F24J 2/05 126/569 |
| 4,344,418 A * | 8/1982 | Leroy | F24J 2/16 126/563 |
| 4,371,028 A * | 2/1983 | Helshoj | F28D 20/025 126/618 |
| 4,416,257 A | 11/1983 | Bale | |
| 4,485,802 A | 12/1984 | Babcock | |
| 4,485,804 A | 12/1984 | Sharpe | |
| 4,519,380 A * | 5/1985 | Laing | F24J 2/402 126/583 |
| 4,848,616 A | 7/1989 | Nozaki | |
| 4,893,611 A * | 1/1990 | Kleinwachter | F24J 2/0461 126/586 |
| 5,172,686 A | 12/1992 | Anthony | |
| 5,499,621 A * | 3/1996 | Trihey | F24D 17/00 122/17.1 |
| 5,575,276 A | 11/1996 | Fossum et al. | |
| 6,370,328 B1 | 4/2002 | Mottershead | F24H 1/202 126/639 |
| 7,669,592 B2 * | 3/2010 | Polk | B01D 1/0035 126/634 |
| 7,726,263 B2 * | 6/2010 | Ben-Ishai | F24H 1/185 122/20 A |
| 8,936,020 B1 * | 1/2015 | Munoz Ruiz | F24J 2/345 126/640 |
| 2007/0227468 A1 | 10/2007 | Gordon et al. | |
| 2007/0227532 A1 * | 10/2007 | Mehler | F24J 2/24 126/640 |
| 2009/0019931 A1 | 1/2009 | Roques et al. | |
| 2010/0192944 A1 | 8/2010 | Gruber | |
| 2010/0199980 A1 | 8/2010 | Ricci et al. | |
| 2011/0021134 A1 | 1/2011 | Zwern | |
| 2011/0024080 A1 | 2/2011 | Bose et al. | |
| 2011/0197878 A1 | 8/2011 | Kuffer | |
| 2011/0247572 A1 | 10/2011 | Smith et al. | |
| 2011/0271953 A1 | 11/2011 | Wortmann et al. | |
| 2012/0024499 A1 | 2/2012 | Chang et al. | |
| 2012/0097152 A1 | 4/2012 | Colson | |
| 2012/0211002 A1 * | 8/2012 | Humphreys | F24H 9/02 126/640 |
| 2012/0234312 A1 | 9/2012 | Nakatani | |
| 2012/0291772 A1 | 11/2012 | Atarashiya et al. | |
| 2013/0047610 A1 | 2/2013 | Penton | |
| 2014/0030555 A1 | 1/2014 | Winkler | |

FOREIGN PATENT DOCUMENTS

| | | | |
|---|---|---|---|
| CN | 202470473 U | 10/2012 | |
| DE | 202006001353 U1 | 5/2006 | |
| EP | 0147345 A2 | 7/1985 | |
| FR | 2513361 A1 | 3/1983 | |
| FR | 2558245 A1 | 7/1985 | |
| FR | 2575811 A1 | 7/1986 | |
| FR | 2613045 A1 | 9/1988 | |
| GB | 2147408 A | 5/1985 | |
| GB | 2455578 A * | 6/2009 | ............... F24J 2/055 |
| GB | 2458272 A | 9/2009 | |
| WO | 8501790 A1 | 4/1985 | |
| WO | 2007112231 A2 | 10/2007 | |
| WO | 2008095876 A1 | 8/2008 | |
| WO | 2013153420 A1 | 10/2013 | |

OTHER PUBLICATIONS

Prosecution history of U.S. Appl. No. 14/588,365 including: Final Rejection dated Dec. 2, 2015; Amendment dated Sep. 23, 2015; Office Action dated Jul. 29, 2015; Examiner Initiated Interview Summary dated Jul. 29, 2015; Preliminary Amendment dated Jul. 10, 2015.
PCT Written Opinion dated Nov. 30, 2011 for corresponding PCT Application No. PCT/MX2011/000054.
PCT International Search Report dated Nov. 30, 2011 for corresponding PCT Application No. PCT/MX2011/000054.
Prosecution history of corresponding U.S. Appl. No. 14/588,365 including: Applicant Initiated Interview Summary dated Jan. 7, 2016; Information Disclosure Statement dated Dec. 30, 2015 and Amendment dated Dec. 30, 2015.
Prosecution history of U.S. Appl. No. 14/205,722 including: Notice of Allowance dated Nov. 25, 2014, Statement of Substance of an Interview dated Nov. 14, 2014, Applicant-Initiated Interview Summary dated Oct. 28, 2014, Amendment dated Oct. 27, 2014, Office Action dated Jul. 31, 2014.
International Search Report from corresponding PCT Application No. PCT/MX2011/000054, filed May 12, 2011.
Prosecution history of U.S. Appl. No. 14/588,365 including: Final Rejection date Jun. 14, 2016; Amendment dated Mar. 25, 2016 and Office Action dated Mar. 2, 2016.

* cited by examiner

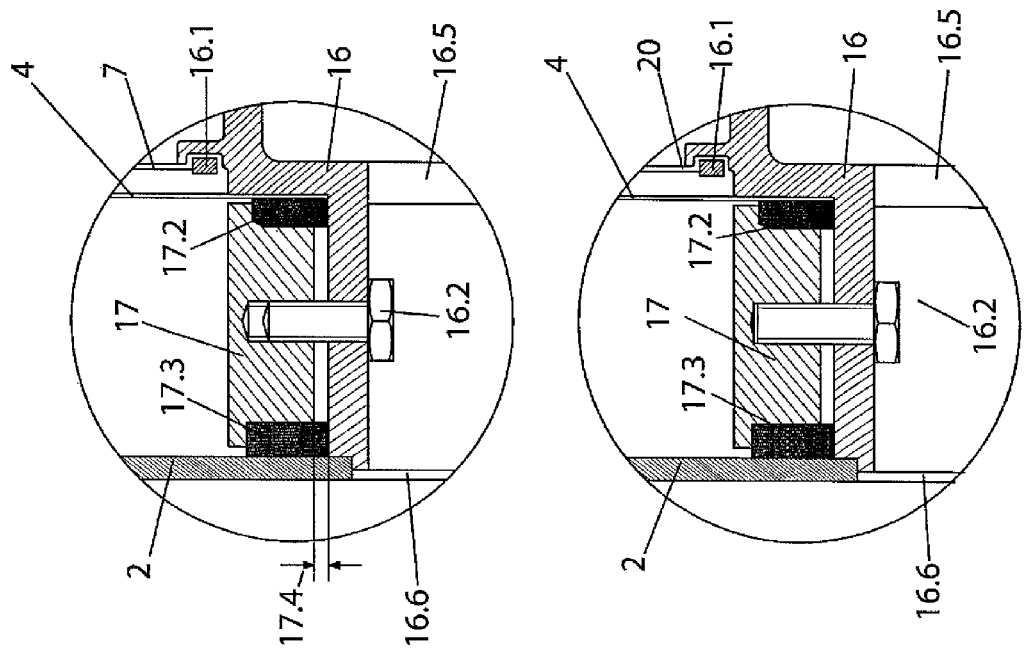
FIG. 4.1

SOLAR HEATER FOR LIQUIDS

TECHNICAL FIELD OF THE INVENTION

In the world today, the constant increase in the energy demand has encouraged the research on new energy sources, and the development of energy saving systems. In this context, the present invention aims for the optimization of the most common used systems nowadays for heating liquid fluids and storage thereof once heated; liquid fluids, mainly water, heaters in their gas, electric and solar settings.

BACKGROUNDS OF THE INVENTION

This invention represents an evolution of the solar water heater claimed by Patent application MX/a/2010/005129 and comprises an improved solar water heater embedding an electrical backup allowing for the continuous supply of hot water to the user independently of the weather conditions and that, with a vertical cylinder shape, embeds all the essential elements in a single compact assembly that works under atmospheric pressure and comprises therein a floodlight in the north facing side, which allows for the reception of the direct solar radiation and reflected in the 360° of the solar collector during daytime.

The object of this invention is to improve the functionality of the solar heater claimed by patent application MX/a/2010/005129, increasing the efficiency of the solar radiation collection system, of the heat to liquid conveyance medium system, of the heated liquid heat retention system and of the heated liquid supply system and changing the design of the solar heater such that the apparatus allows not just for water heating, but other liquid fluids heating.

DETAILED DESCRIPTION OF THE INVENTION

The characteristic features of this novel solar liquid fluids heater are clearly shown in the following description and accompanying drawings. The reference signs indicating the parts of the figures shown may be followed.

BRIEF DESCRIPTION OF THE DRAWINGS

FIG. 4.1 shows the detail of the sealing gaskets between the solar collector and the transparent cover by the sealing ring (17).

LIST OF REFERENCE SIGNS AND APPOINTED ELEMENTS

Figure 1:
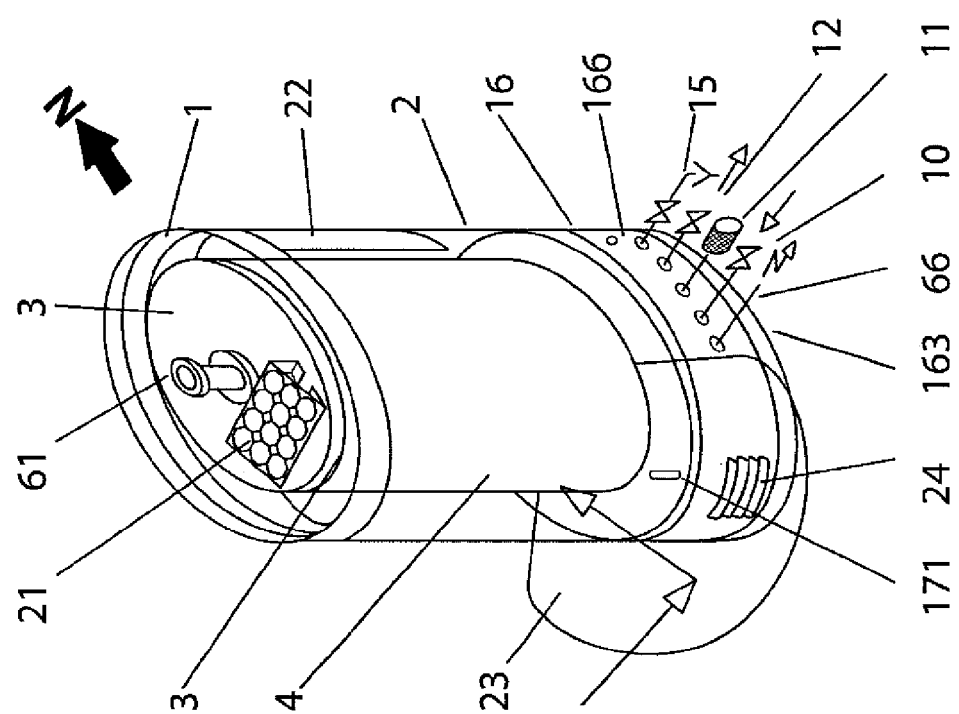
FIG. 1 is an isometric perspective of the assembly of the invention.

| Reference Sign | Appointed Element |
| --- | --- |
| 1 | Top side of the dome-shaped transparent cover |
| 2 | Cylindrical bottom portion of the transparent cover |
| 3 | Top portion of the dome-shaped solar collection surface |
| 4 | Cylindrical bottom vertical portion of the solar collection surface |
| 5 | Bottom check valves |
| 5.1 | Arrow indicating the liquid flow direction in the bottom portion |
| 6 | Central tubular axle with ribs |
| 6.1 | Transparent cover top portion (1) retaining screw and air bleeder |
| 6.1.1 | Retaining screw sealing gasket (6.1) |
| 6.1.2 | Top Spacer sealing gasket (6.2) |
| 6.1.3 | Air bleeding conduit |
| 6.2 | Top spacer |
| 6.3 | Middle spacer |
| 6.3.1 | Sealing Gasket of the solar collection surface top portion (3) |
| 6.3.2 | Connecting sleeve of the central tubular axle (6) and the middle spacer (6.3) |
| 6.4 | Inner conduit for air bleeding |
| 6.5 | Conveying heat ribs of the central tubular axle (6) |
| 6.6 | Electrical junction outlets |
| 6.7 | Sealing system nuts and locknuts |
| 7 | Elastic membrane |
| 8 | Vertical cylinder-shaped isolated storage tank |
| 8.1 | Isolating filling material of the storage tank (8) |
| 8.2 | Top fastening clamp of the elastic membrane (7) |
| 8.3 | Top locking ring of the storage tank (8) |
| 9 | Top check valves |
| 9.1 | Bottom check valves (5) housing |
| 9.2 | Flexible sheet (9.4) fastening plate |
| 9.3 | Valve body |
| 9.4 | Flexible sheet for hinging the closing disk |
| 9.5 | Check valves (5) and (9) closing disks |
| 9.6 | Fastening screws from the closing disks (9.5) to the flexible sheet (9.4) |
| 9.7 | Screw nut (9.6) |
| 9.8 | Fastening screw from the flexible sheets (9.4) to the valve body (9.3) |
| 9.9 | Screw nuts |
| 10 | Cold fluid inlet tube into the solar heater |
| 10.1 | Float valve |
| 10.2 | Deflector |
| 10.3 | Connecting rod between the float (10.5) and the float valve (10.1) actuating mechanism |
| 10.4 | Float (10.5) guiding and protection component |
| 10.5 | Float |
| 10.6 | Float valve (10.1) joint |
| 11 | Vent tube and siphon overflow |
| 11.1 | Filter |
| 11.2 | Atmospheric balance opening |
| 11.3 | Overflow opening |
| 11.4 | Bushing fastening nuts |
| 11.5 | Siphon closing |
| 12 | Hot fluid outlet fixed tube |
| 12.1 | Hot fluid outlet moveable tube |
| 12.2 | Float |
| 12.3 | Hot fluid outlet opening |

-continued

LIST OF REFERENCE SIGNS AND APPOINTED ELEMENTS

| Reference Sign | Appointed Element |
|---|---|
| 13 | Supporting electric resistors |
| 13.1 | Electronic temperature sensor |
| 13.2 | Electrical conduit for powering the resistors |
| 13.3 | Fastening nuts from the supporting tube (13.4) to the centralizer cross profile. |
| 13.4 | Resistors supporting tube |
| 13.5 | Temperature control microprocessor |
| 14 | Fluid within the storage tank (8) |
| 15 | Emptying tube |
| 16 | Circular bottom |
| 16.1 | Bottom fastening clamp of the elastic membrane (7) |
| 16.2 | Sealing washer (17) clamping bolts |
| 16.3 | Base |
| 16.4 | Outer isolation of the circular bottom (16) |
| 16.5 | Spacer components between the base (16.3) and the circular bottom (16) |
| 16.6 | Bottom protective cover |
| 17 | Sealing ring |
| 17.1 | Inert gas charging valve |
| 17.2 | Sealing gasket |
| 17.3 | Sealing gasket |
| 17.4 | Clamping gap for expanding gaskets 17.2 and 17.3 |
| 18 | Arrow indicating the liquid flow direction in the top portion |
| 19 | Volume defined by the outer transparent cover (1) and (2), the solar collection surface (3) and (4), and the sealing ring (17). |
| 20 | Volume defined by the collection surface (3) and (4) and the elastic membrane (7). |
| 21 | Photovoltaic panel |
| 21.1 | Charge controller |
| 21.2 | Electrical conduits for connection between the photovoltaic panel and the charge controller (21.1) |
| 21.3 | Photovoltaic panel support (21) |
| 21.4 | Batteries |
| 21.5 | Fluid pump with built-in flow switch |
| 21.6 | Power source |
| 22 | Front floodlight |
| 23 | Rear floodlight |
| 24 | Venting grill |
| 25 | Electrical junction box |
| 25.1 | Electrical conductors |
| 26 | Volume comprised between the elastic membrane (7) and the storage tank (8) outer surface |
| 27 | Working level of the fluid |
| 28 | Maximum level of the fluid |
| 29 | Centralizer cross profile |

Referring to FIG. 1, the solar liquid fluids heater object of this invention is mainly comprised by a central cylindrical body (4) and a top lid (3) comprising the solar radiation collector surface. Said solar radiation collector is airtight closed within the gap defined by the outer transparent cover (1 and 2) and by a circular bottom (16). In the top portion, the screw (6.1) attaches the transparent top cover to the top cover of the solar collector (3).

In the inner surface of the outer transparent cylinder (2) facing to the north, the front floodlight (22) made of mirror polished stainless steel is attached.

In order to enhance the solar radiation that impacts the East, South and West facing portions of the solar collection absorber (3 and 4) surface, a rear floodlight (23) made of mirror polished stainless steel is installed.

Between the circular bottom (16) and the base (16.3), spacer components (16.5) forming the necessary gap for allowing the connection of the electrical junction outlet (6.6) tubes, the cold fluid inlet (10), the vent tube and siphon overflow (11), the hot fluid outlet tube (12) and the emptying tube (15) are mounted. This gap will also be used for the installation of the hot fluid outlet overpressure system powered by the photovoltaic cell (21) installed over the top solar collection surface (3). This gap is closed by the bottom protective cover (16.6) provided with venting grills (24).

Finally, the inert gas charging valve (17.1) allows for the charge thereof in the gap (19) comprised between the transparent cover (1 and 2) and the solar collector (3 and 4).

Figure 2:
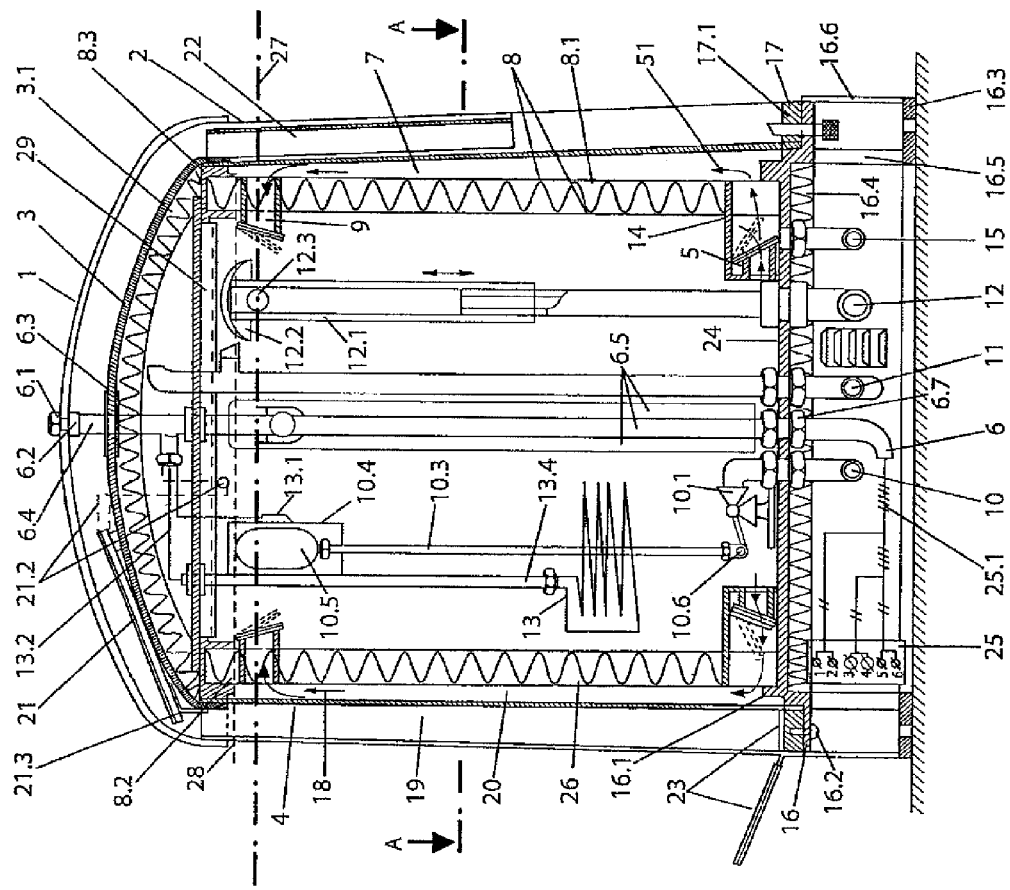
FIG. 2 is a cross-section of the side elevation of the assembly of the invention (seen from section B-B' of same).

FIG. 2 constructively illustrates what is explained as follows. In the lower side of the circular bottom (16), a thermal isolation layer (16.4) is attached thereto. Over the upper side of the circular bottom (16) the cylindrical hot fluid storage tank (8) is mounted, which is a double cylinder wherein a thermal isolation (8.1) has been introduced between its concentric walls for minimizing the heat losses of the fluid (14) contained therein. The top locking ring (8.3) is attached to its top portion, which completes the assembly, provides stiffness thereto and works as a support for the centralizer cross profile (29), the vertical cylinder of the solar collector (4) in its top portion and the top portion of the elastic membrane (7) by means of the clamp (8.2).

Figure 4:
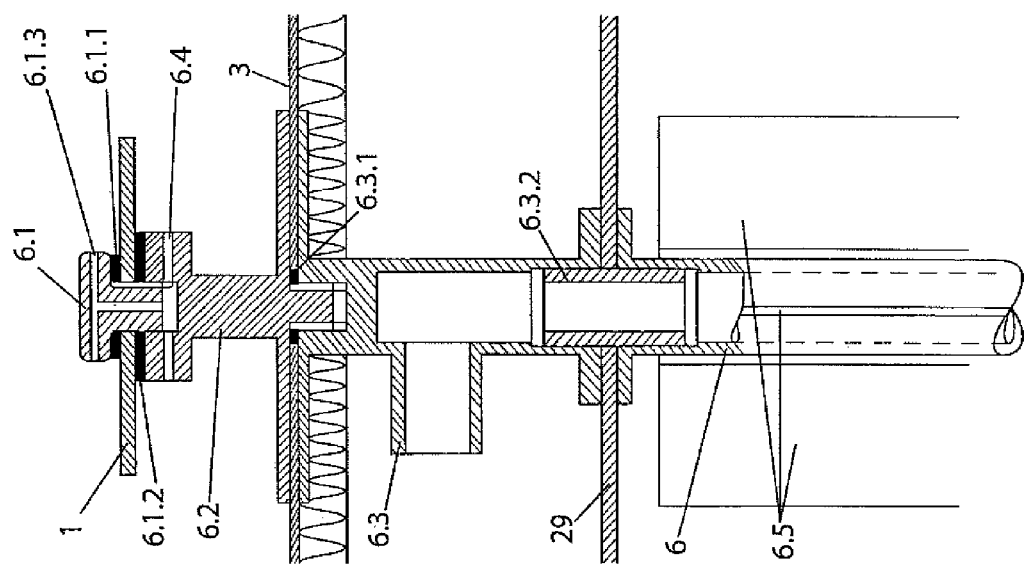
FIG. 4 shows the detail of the top side of the central tubular axle with ribs of the invention.

The central tubular axle with ribs (6) is strongly attached to the circular bottom (16) by means of nut and locknut (6.7) and in its top portion when being threaded to the middle spacer (6.3) in the connecting sleeve (6.3.2) to the centralizer cross profile (29) as seen in FIG. 4, strongly fastening the cylindrical hot fluid storage tank (8) against the circular bottom (16) The hot fluid storage tank (8) is provided with openings in its top and bottom areas, wherein the top (9) and bottom (5) check valves are mounted. The circular bottom (16) is provided with openings that allow for the passage and installation of:

a) The cold fluid inlet tube (10) where the float-actuated valve (10.1) with its deflector (10.2) and its actuating mechanism (10.6) is mounted;

b) The hot fluid outlet tube (12) where the hot fluid outlet system is mounted, comprised by a float (12.2) attached to a moveable tube (12.1) in which top portion the hot fluid outlet opening (12.3) is provided;

c) The vent tube and siphon overflow (11);

d) The emptying tube (15).

The supporting electric resistors (13) are fastened to the centralizer cross profile (29) by means of its support (13.4), the middle spacer (6.3) and the central tubular axle with ribs (6) from which they emerge towards the electrical junction box (25).

The next step is installing the elastic membrane (7) fastening same in its bottom portion by means of the clamp (16.1), such that the tightness of the joint is ensured, and in its top portion it is fastened to the top locking ring of the storage tank (8) by means of the fastening clamp (8.2).

Next, the bottom portion of the solar collector cylinder (4) is fitted into its housing in the circular bottom (16), thereby fastening same by its top portion to the top locking ring of the storage tank (8).

Over the solar collector cylinder (4) the solar collector lid (3) is fitted and its tightness is ensured with a heat conductor paste or similar that does not harden so as to allow for subsequent disassemblies. This component (3) is provided with openings for the passage of the electrical conductors of the photovoltaic panel (21) and for the top spacer (6.2) (as shown in FIG. 4) that firmly fastens same to the central tubular axle (6) when threaded into the middle spacer (6.3). The sealing gasket (6.3.1) among both, ensures the subsequent tightness of the volume (19) defined by the transparent cover (1 and 2) and the solar collector (3 and 4).

As shown in FIG. 2, over the solar collector lid (3) the photovoltaic panel (21) is mounted by means of the supports (21.3) in the south facing area.

Then, the sealing ring (17) is mounted, adjusting same to the bottom portion of the solar collector cylinder (4) and then the cylindrical bottom portion of the transparent cover (2) is mounted, fitting the sealing ring (17) thereto. As shown in FIG. 4.1, this sealing ring (17) is made in such way so when the 6 bolts (16.2) are clamped, it compresses the sealing gaskets (17.1 and 17.2) against the transparent cover cylinder (2) and the solar collector cylinder (4), respectively, when introducing the clamping gap (17.4) ensuring the tightness.

Figure 3:
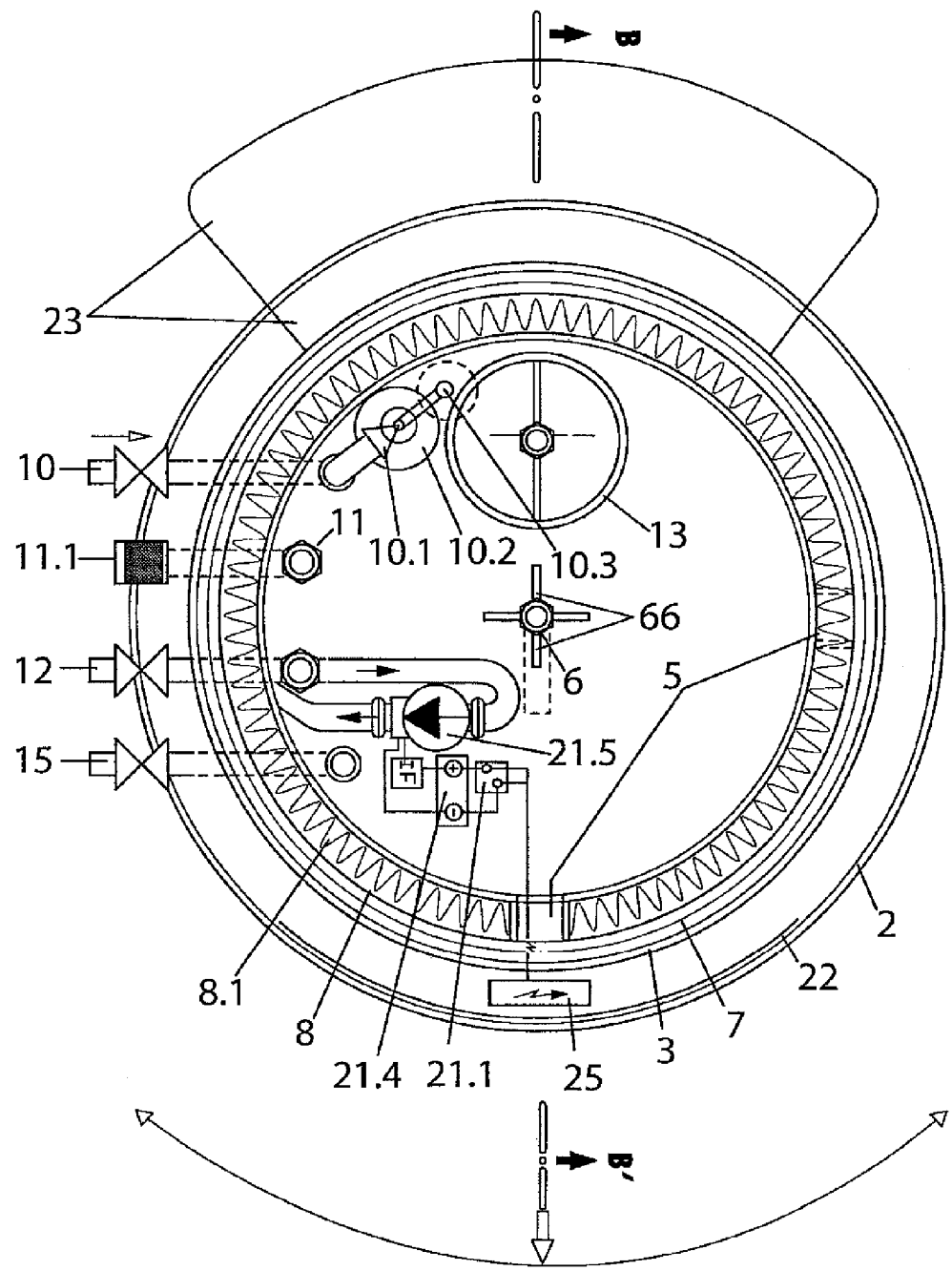
FIG. 3 is a cross-section of section A-A' of the plan view of the assembly of the invention.

Within the transparent cover cylinder (2), in the north facing area the front floodlight (22) is mounted, adapting same to the inner curvature of said transparent cover. This front floodlight (22) extends to 60° at each side of the north facing axle, as shown in FIG. 3. The material may be mirror polished stainless steel or the like.

Then, the transparent cover dome (1) is mounted, fitting same in the transparent cover cylinder (2) and ensuring its fitting by means of a transparent silicone paste or the like, which remains soft for allowing the disassembly when necessary.

As it may be seen from FIG. 4, the screw (6.1) fastens the transparent cover dome (1) against the top spacer (6.2). The gasket (6.1.2) among them ensures the tightness in that binding as well as the gasket (6.3.1) ensures same between the top spacer (6.2) and the solar collector lid (3).

In the lower portion of the circular bottom (16), the spacer components (16.5) are mounted with the base component (16.3), thus creating enough space for housing the hydraulic and electrical junctions outlet, the hot fluid pressurizing system components, and the electrical junction box (25). In those places wherein the solar radiation is low, the rear floodlight (23) will be placed attached to the circular bottom, as shown in FIG. 2.

Finally, the gap (19) defined by the transparent cover (1 and 2), the solar collector (3 and 4) and the sealing ring (17) would form an air chamber for achieving the greenhouse effect and the necessary thermal isolation for reducing the heat losses of the liquid contained in the solar heater object of this invention, this air being replaced by an inert gas (argon), and for such ends, same is slowly injected through the charging valve (17.1) at low pressure. As argon is heavier than air, same is displaced towards the top portion of the gap (19) and exits outwards through the conduit (6.4) (see FIG. 4) of the top spacer (6.2) and the conduit (6.1.3) of the top screw (6.1). Finally, by an argon gas detector located near the conduit (6.1.3) it may be verified when the supply has been completed, the gap (19) remaining at atmospheric pressure.

Once the Constructive Description of the Solar Liquid Fluids Heater Object of this Invention, we Explain its Operating Mode and its Most Relevant Improvements.

Figure 6:
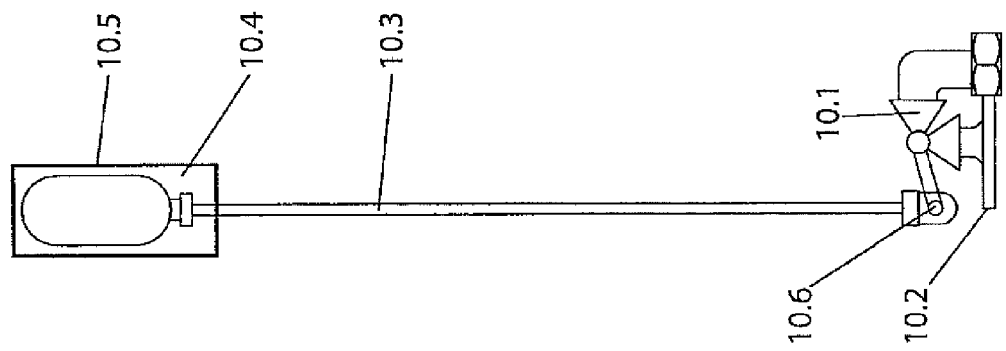
FIG. 6 shows the detail of the cold fluid supply automatic system.

First, the solar heater must be filled with the fluid to be heated through the automatic supply system depicted in FIG. 6. The supply of the cold fluid enters into the solar heater object of this invention through the tube (10) of FIG. 1 that traverses and fastens to the circular bottom (16) by means of a nut and a locknut. A sealing paste applied in the bonding ensures tightness. To this tube (10) of FIG. 1, the float valve (10.1) is connected, which by means of the joint (10.6) and the rod (10.3) attached to the float (10.5) will actuate said float valve (10.1) in such a way that when it reaches the desired fluid level (27), it closes, and when said level decreases (27.1) it opens again, maintaining a constant level. A guide and protection tube (10.4) maintains the float (10.5) in the correct position. This design allows for the mounting of the charging valve in the bottom portion of the tank, unlike patent application MX/a/2012/005129, wherein the valve was mounted in the top portion of the tank, being necessary an upward tube for the cold liquid up to the valve and another downward tube for the liquid from the valve to the bottom portion of the tank for injecting the cold liquid by the lower part of the tank.

A deflector (10.2) is coupled to the outlet of the valve (10.1) for forcing the cold liquid to maintain in the bottom portion of the isolated storage tank (8) and keep the stratification due to different temperatures of the liquid when preventing turbulence formations unlike patent application MX/a/2010/005129 which lacked of such deflector.

Figure 5:
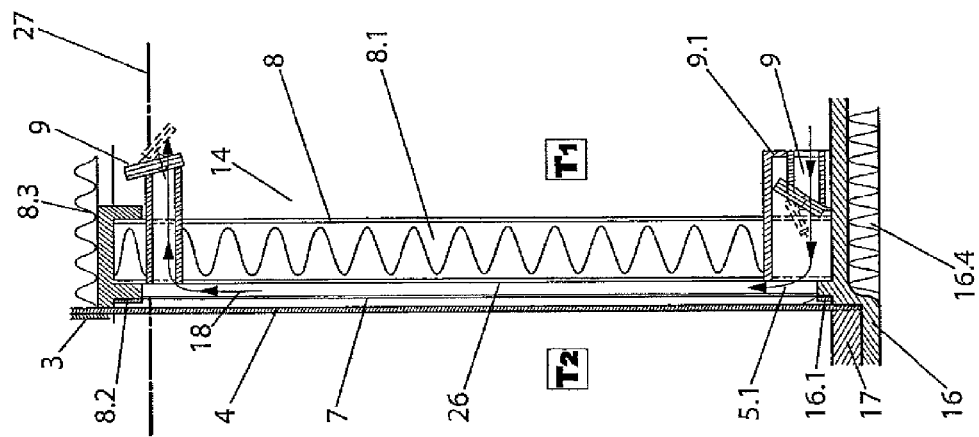
FIG. 5 shows the detail of the thermosiphon circulation system and of the elements characterizing same.

As the isolated storage tank (8) is been filled with liquid, see FIG. 5, same exerts pressure in the elastic membrane (7) which releases itself until it leans against the inner portion of the solar collector cylinder surface (4) formed by a metal sheet (7), which is a good heat conductor (copper, aluminum, iron and its alloys, etc.) outwardly coated by a great solar radiation absorber paint (matte black or selective) with a thickness sufficient (in the range of 1 to 0.5 mm) for supporting the pressure exerted by the liquid over same (due to the reached height).

The elastic membrane (7) completely couples against the inner portion of the vertical cylinder (4) and, due to its minimum thickness (in the range between 0.2 to 0.5 mm), it allows for the heat produced in the solar collector surface (3 and 4) to flow therethrough and towards the liquid (14) more efficiently and with more service safety than the collector claimed in patent application MX/a/2010/005129, wherein the solar collector was comprised by tube coils made of plastic material that could be further damaged by the concentration of radiation of the front and rear floodlights when the tubes were liquid-emptied.

Likewise, this elastic membrane (7) made of a polymer that is compatible with the liquid to be heated (14) contained in the solar heater (4) storage tank, prevents the contact among this and the metal surface of the solar collector, so the same remains safe from inlays and rust which could result in chemical aggressive or electrogalvanic liquids. This same arrangement may be applied in heat exchangers for other technical applications wherein the liquids are chemically aggressive. Likewise, all the elements contacting the liquid (14) would be compatible with same. This allows for this solar heater to be used for the heating of any kind of liquid, unlike patent application MX/a/2010/005129 which could only heat domestic water as other kind of more corrosive liquids could affect the integrity of the solar collector made of thermoplastic materials.

The vertical cylindrical shape of the solar collector (3) allows same to directly receive the solar radiation during day time in its east, south and west facing surface. The front floodlight (22) mounted inside the transparent cover cylinder (2) in a 120° sector whose central axle is facing north as seen in FIG. 3, allows for the solar radiation to reach the north facing solar radiation collector surface (3) due to reflection, so it is achieved that the solar radiation reaches 360° of its surface. As the floodlight is installed within same, it is possible to maintain it clean, keeping its efficiency. Unlike patent application MX/a/2010/005129, wherein the solar collector was eccentrically installed relative to the transparent cover for the easiness of the solar radiation in reaching the front floodlight, in the solar heater object of this invention, the fact that the solar collector receiving the radiation in its top lid (3) allows for the solar collector to be concentrical relative to the transparent cover (1 and 2) so the volume of the solar heater is reduced, and thus, its manufacturing and conveyance costs.

Likewise, the dome shape of the solar collector lid (3) allows to more efficiently receive the solar radiation in any orientation during all day time, even if the south facing flat surfaces with the slope corresponding to the latitude in which they are.

The heat produced in the solar collector lid (3) is conveyed to a portion of the solar collector cylinder (4) to which it is airtight fitted, and on the other hand to the central tubular axle with ribs (6) to which the lid (3) is attached by the middle spacer (6.3), directly conveying this heat to the liquid (14) unlike patent application MX/a/2010/005129, wherein the solar radiation heat was only conveyed through the plastic tube coils of the solar collector.

In low radiation places, the reception of same may be enhanced by installing the rear floodlight (23.1), which when added to the direct and diffuse radiation, increases the total amount of radiation received by the solar absorber cylinder (4).

When the solar radiation impacts the solar collector surface (see FIG. 5), the liquid contained in the gap (26) comprised between the inner face of the elastic membrane (7) and the outer face of the storage tank (8) is heated that, as the density decreases, it rises. This natural circulation is known as thermosiphon circulation.

The coldest liquid contained in the inner portion of the isolated storage tank (8), due to the thermosiphon circulation indicated by arrows (5.1 and 18) enters into the gap (26) through the bottom check valves (5) and exits same (26) into the isolated storage tank (8) through the top check valves (9) at a temperature higher than the one it had when it entered by the bottom portion due to the heating produced by the solar radiation when impacting on the solar collector surface. As a result, the liquid contained in the solar fluids heater object of this invention is gradually heated through the entire solar radiation day time period. This thermosiphon circulation is performed more efficiently than in the solar heater of patent application MX/a/2010/005129 as, when not having to traverse the tubular coils along its rise through the solar collector, there is no charge loss and the liquid circulates more freely.

All this mass being heated by solar radiation, issues infrared radiation-like heat, that mostly may not exit again as the transparent cover comprised by the dome (1) and the cylinder (2) heat the air or gas contained in the gap located between the transparent cover (1 and 2) and the collection surface (3 and 4), thus creating a greenhouse effect. When the temperature of the gap (19) is higher than the temperature of the collector surface (3 and 4), it is conveyed by convection to the liquid (14) increasing the thermal efficiency of the solar heater object of this invention.

On the other hand, during the periods in which there is no solar radiation, or same is poor, the liquid within the gap (26) inside the elastic membrane (7) and the isolated storage tank (8) may be colder than inside the gap. In this case, and if there is no impediment, the thermosiphon circulation could be reversed, in which case the solar radiation collection surface (3 and 4) will act as a sink for the heat stored in the liquid (14). In order to avoid this, the top (9) and bottom (5) check valves have been provided, which along with the thermal isolation (8.1, 16.4 and 3.1) allows to keep the heat of the liquid (14) inside the storage tank (8).

Figure 8:
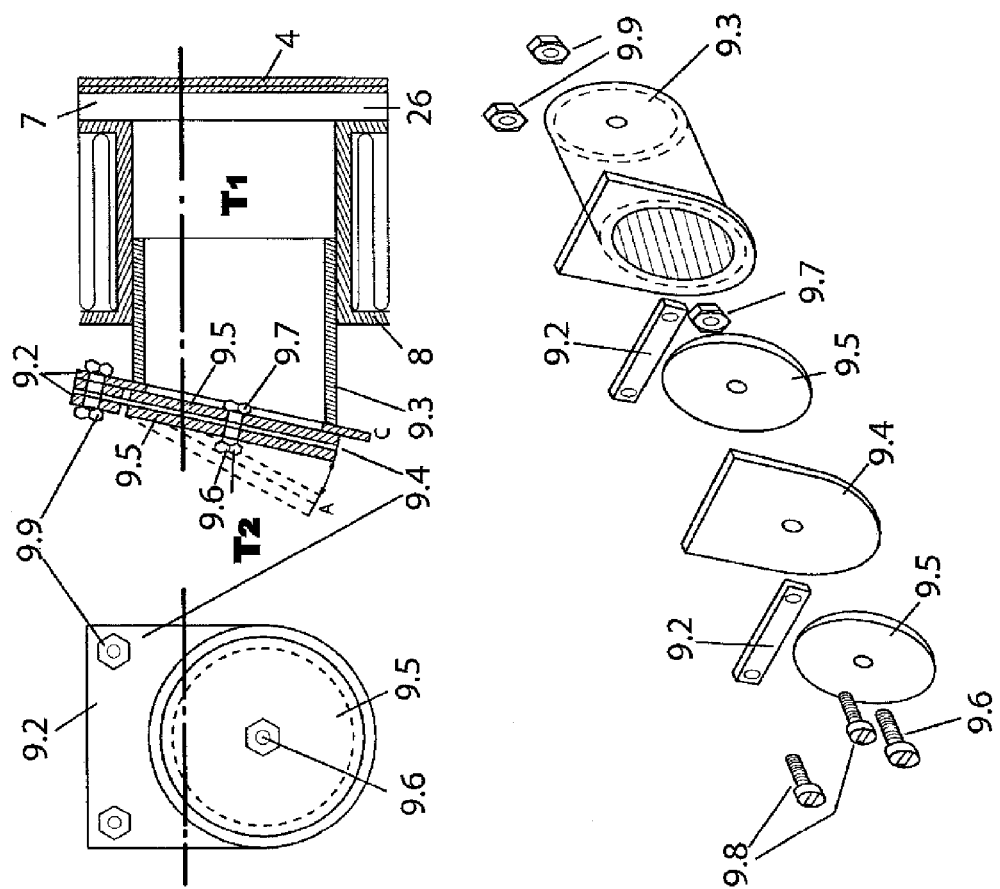
FIG. 8 shows the detail of the check valves of the invention and the components thereof.

The check valves (5 and 9) of FIG. 8 are comprised by:
9.1 Bottom check valves housing (5) of FIG. 5.
9.2 Flexible sheet fastening plate (9.4)
9.3 Valve body
9.4 Flexible sheet for hinging the closing disk (9.5)
9.5 Check valves (5) and (9) closing disks
9.6 Fastening screw from the closing disks (9.5) to the flexible sheet (9.4)
9.7 Screw nut (9.6)
9.8 Fastening screw from the flexible sheets (9.4) to the valve body (9.3)
9.9 Screw nuts Their main function is to allow the circulation of the liquid contained in the solar heater in one direction (direction of the arrows 8.1 and 18 of FIG. 5). As may be seen from FIG. 8, the check valves are comprised of a cylindrical valve body (9.3) which in one of its ends has a sloping surface that works as a support for the hinged closing disk comprised by the flexible sheet (9.4), the two disks (9.5) and the screw (9.6) with its nut (9.7).

When attaching the described components, the hinged closing is formed, which has a specific weight slightly higher than the liquid (14) of FIG. 2 in which it is immersed.

By means of the fastening plate (9.2) and the screw (9.8) with its nuts (9.9), the valve (9.3) is attached to the hinged closing by means of the flexible sheet (9.4). In the normal position (liquid (14) temperature T2=T1, FIG. 5) the valve remains closed as the hinged closing rests upon the sloping support of the valve body (9.3) due to gravity.

If temperature in T2 rises, it results in the thermosiphon circulation (in the direction of arrows 5.1 and 18 of FIG. 5) and the valve is opened due to the flow produced, allowing for the passage of the liquid from (26) T2 until (14) T1.

When the liquid temperature (26) T2 is lower than T1 (14), the valve remains closed (due to gravity and because the reverse flow direction pushes the hinged closing against the sloping surface of the valve body (9.3) support).

This design is more efficient than the design of the check valves of patent application MX/a/2010/005129, as the screw hinging the movement of same has been replaced by a flexible sheet (9.4) that avoids the clogging issue of the valve actuation due to possible rust or pollution of the hinge.

Figure 9:
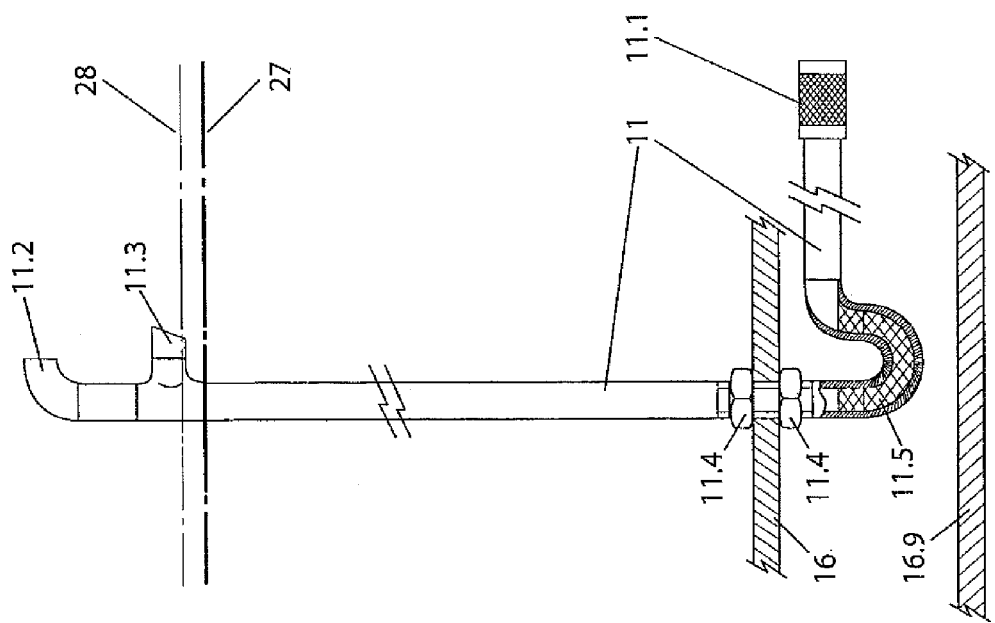
FIG. 9 shows the detail of the atmospheric pressure balance and overflow system of the fluid excess load.

The atmospheric balance and siphon overflow tube (11) FIG. 9, comprises the following components:

A main tube (11) traversing the circular bottom (16) attached thereto by the nuts and locknuts (11.4) and a sealing paste ensures the tightness of the binding. In its top portion, at a higher (27) level (28) than the liquid (14), there is the overflow opening (11.3) that would empty the liquid (14) outwardly if same should surpass the maximum level (27) preventing the surpass of the storage tank (8) height and the vent opening (11.2) whose function is to connect the top portion (liquid free) of the interior of the solar heater with the atmosphere, so it may be kept always at atmospheric pressure.

In its bottom portion, an hydraulic siphon closing (11.5) is inserted, which prevents the entrance of foreign objects from outside, but allows for the atmospheric balance. As a complement, a filter (11.1) is coupled at the bottom end for preventing the entrance of bugs and other impurities.

The novel design of the fluids heater object of this invention, allows it to have an open circuit as it works with atmospheric pressure and avoids the use of components that work overpressure (storage tank (8), collector (4), etc). Due to this, the manufacturing cost and the weight of the heater object of this invention, is markedly lower than the currently marketed solar heaters, as they use expensive materials such as copper, steel and crystal, while in this case, except for the collector (3 and 4), all the other components are made from recycled thermoplastic materials with low ecological footprints. This allows that the fluids heater object of this invention may be a low-cost one, affordable to the consumer.

When the user opens any valve of the hot liquid supply installation coupled to the outlet tube (12), this supply may be performed by gravity if the height differential between the liquid level (27) and the supply point is sufficient (3 meters for water). In this case, the exit of hot liquid will be made through the highest and hottest portion of same (FIG. 7) through the hot liquid openings (12.3) performed in the moveable tube (12.1) that slides suspended by the reversed hollow spherical cap-shaped float (12.2) along the fixed tube (12) that allows same to maintain the openings (12.3) under the surface, collecting the hottest liquid although the level (27) decreases to 45% during the extraction due to a possible lag between the cold liquid entrance volume and the cold liquid exit. This cold liquid supply moveable system is more efficient than the one given by patent application MX/a/2010/005129 as the hot liquid inlet is fixed in a point and does not dynamically ensure the liquid entrance of the hottest point.

The length of the fixed (12) and moveable (12.1) tubes is such that the sliding connection among same is never lost. If the height differential among the liquid level (27) and the supply point is not sufficient, the installation of an overpressure automatic pump (21.5) (FIG. 2) of the hot liquid circuit (12) powered by a photovoltaic panel (21) is foreseen, unlike patent application MX/a/2010/005129, in which the electric supply to the overpressure system required an electrical junction to an outer power supply.

Figure 7:
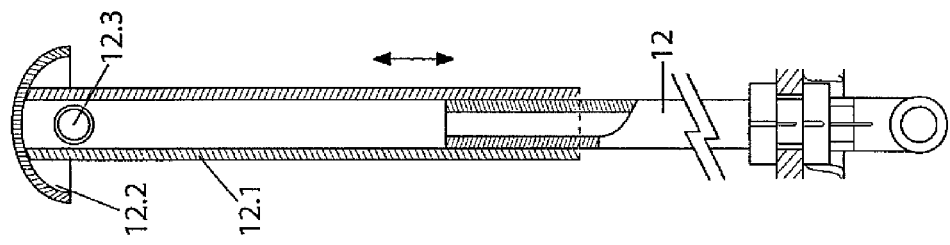
FIG. 7 shows the detail of the hot fluid supply automatic system.

In this case, when the user opens any hot liquid valve, a flow switch built-in the pump (21.5) closes its contact, turns it on suctioning the liquid (14) of the top portion through the hot fluid outlet openings (12.3) FIG. 2 and FIG. 7, and over presses the supply line and when the hot liquid supply is stopped, the pump automatically stops when the flow switch contact is opened. This overpressure pump with flow switch (21.5) as well as the electric components; battery (21.4), and charge controller (21.1) are deployed between the base (16.3) and the circular bottom (16) of FIG. 2. These electric elements along with the photovoltaic panel and the interconnection electrical conductors comprise the electric supply system of the overpressure pump (FIG. 11).

Figure 11:
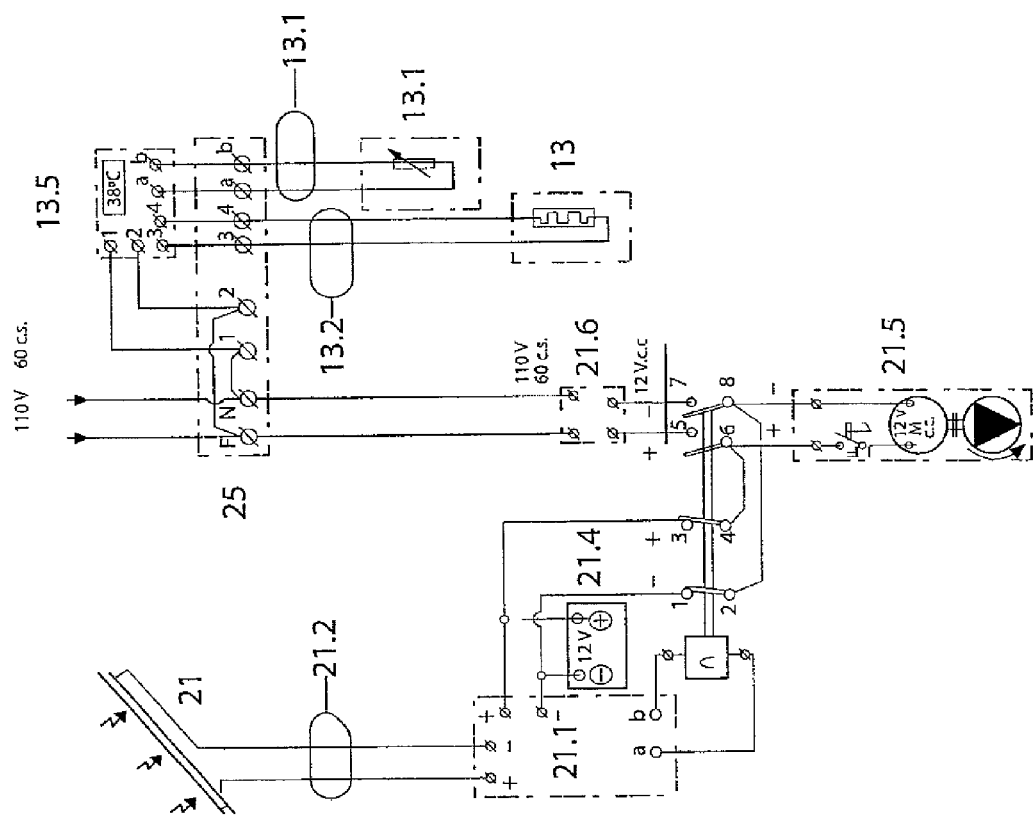
FIG. 11 shows the electrical junctions of the different elements.

The operation is as follows: the photovoltaic panel (21) turns the solar radiation into electric energy as direct current, this conversion is performed by the photovoltaic cells. The photovoltaic panel is connected to the charge controller (21.1) whose functions are:

controlling the battery charge, disconnecting the intake equipment (21.5); in the event of an excessive battery charge (in this case, relay N) it is switched for powering the pump with the power source (21.6) of FIG. 11; and protecting against short circuits and over charges.

As may be seen from FIG. 2, the photovoltaic panel (21) is mounted in the gap (19) defined by the transparent cover dome (1) and the solar collector lid (3) and has the following advantages:

1. It comprises a single assembly with the solar heater of this invention, with no need of installation of external junctions.

2. It is protected of the environment, avoiding the damages produced by hail, objects thrown by the wind, dust, dirt, etc.

3. As the panel is surrounded by the inert gas occupying the gap (19) between the dome of the cover (1) and the collector lid (3), the risk of fire is avoided as combustion is not possible in inert atmosphere, and further, the rust, pollution and spoilage are prevented, so the photovoltaic panels may be mounted without the protective tempered glass, which turns it less expensive and with less weight.

The photovoltaic panel and the batteries are sized so as to supply electric energy to the pump at least 1 hour daily, this is a higher time to the normal operation of the pump for supplying 200 liters of hot liquid at 10 liters per minute, equivalent to 20 minutes of daily operation.

Figure 10:
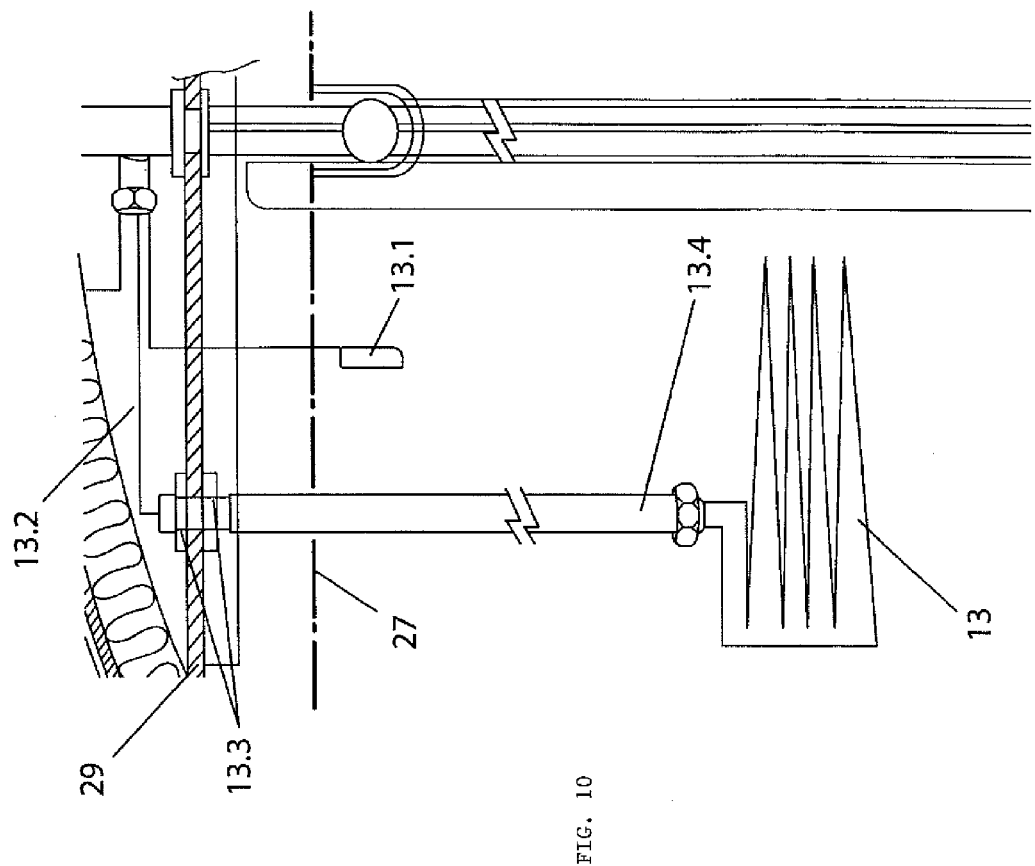
FIG. 10 shows the detail of the supporting electric resistors of the invention.

The supporting resistors (13) of FIG. 10 work for ensuring the hot liquid supply in the cases in which the solar radiation is not enough. The operation of these resistors is controlled by a microprocessor (13.5) of FIG. 11 provided with an electronic temperature sensor (13.1) of FIG. 2, which senses the temperature within the hot fluid storage tank (8). This microprocessor (13.5) is prepared for controlling the connection and disconnection temperatures of the supporting electric resistors (13). The installed power of these resistors will be determined based on the length of same and thus, may be settled according to the needs of each particular user. The microprocessor (13.5) may be installed in the location that the user decides and, by means of an electronic display, will provide him a constant reading of the hot liquid temperature. These resistors (13) are immersed in the liquid (14) to be heated, are self-regulating and comprise a 2 conductors-flat wire (nickel and copper) enclosed in a plastic material that has the property of heating as the electrical current passes between both conductors, thus developing a maximum heating power per lineal meters and that, when reaching a differential temperature among same and the liquid to be heated (may vary depending on the type of resistor), in this case 60° C., it turns increasingly resistant to the electric current, up to 10% of its rated value as well as its corresponding electric intake. On the other hand, their outer fluopolymer FEP isolation allows them to work immersed with a total safeness.

If the user desires to avoid the electrical intake of the supporting resistor (13), in certain times of the year it will suffice for him to disconnect the temperature control microprocessor (13.5) resistors switch of FIG. 11.

The installed power of these resistors (13) will be determined based on the length of same (w/m) and thus, it will be settled according to the needs of each user.

The gap (19) defined by the transparent cover (1 and 2) and the solar collector (3 and 4) and the sealing ring (17) of FIG. 4.1, comprises an air chamber for achieving the greenhouse effect and the necessary thermal isolation for decreasing the heat losses of the contained liquid.

Unlike patent application MX/a/2010/005129, in the solar heater object of this invention, the air of the chamber that creates the greenhouse effect (19) is replaced by an inert gas (argon), for such ends, the gas is slowly injected through the charging valve (17.1) of FIG. 2 at low pressure. As argon is heavier than air, this is displaced towards the top portion of the gap (19) and exits outwards by the conduit (6.4), see FIG. 4, of the top spacer (6.2) and the conduit (6.1.3) of the top screw (6.1) by means of an argon gas sensor located closed to the conduit (6.1.3) verifying when the filling has been completed leaving the gap (19) at atmospheric pressure.

This air for argon replacement in the gap (19) provides the following advantages:

1. Its thermal conductivity is 30% lower than that of the air, so an improvement of the thermal isolation is achieved in that ratio, increasing the thermal performance;

2. It contains no humidity, so condensates of same would be formed over the inner surface of the transparent cover (1 and 2) reducing the solar radiation upon the solar collector surface (3 and 4). Thus, unlike patent application MX/a/2010/005129, a silica gel container is not needed for fighting humidity.

3. As it is an inert gas, prevents the decay due to rust and corrosion of the surfaces contacting same, extending the shelf life of the solar heater object of this invention.

4. Argon gas is completely innocuous, non-toxic, odorless, colorless, non-flammable and does not affect the solar radiation conveyance. It is obtained from the fractional condensation of the air, from which it comprises 1%. It is plenty and inexpensive.

Finally, the design of the solar heater object of this invention allows for a more efficient solar collection than the solar heater of patent application MX/a/2010/005129, so that in sunny days (in case of using it for heating domestic use water) provides hot water with a temperature between 45° C. and 55° C., and saves, according to the latitude, up to 90% of the energy used for heating water from other non-renewable sources, reducing in up to 90% the emissions of $CO_2$ to the atmosphere.

Likewise, for the 10% of time in which there would not be enough solar radiation, the supporting electric resistors would ensure a permanent hot water supply.

Having sufficiently described my invention, I consider as novel and thus I claim as my exclusive property the contents of the following claims:

1. A solar fluid heater comprising:
    a cylindrical central body;
    a dome-shaped top lid connected to the cylindrical central body, the dome-shaped top lid comprising a solar radiation collector surface;
    a circular bottom;
    a base joined to and below the circular bottom;
    an inner cylindrical liquid storage tank configured to store hot liquid within the cylindrical central body under the top lid and above the circular bottom, the cylindrical storage tank comprising an emptying tube configured to empty the cylindrical storage tank, a cold fluid inlet, a hot fluid outlet, and a siphon overflow tube to control a liquid level in the cylindrical storage tank;
    a thermal interchange system comprising:
        an elastic membrane over an outer surface of the cylindrical liquid storage tank within the cylindrical central body,
    a solar radiation collector comprising:
        a transparent top cover spaced apart from and over the top lid and the cylindrical central body to form a gap, the transparent top cover having cylindrical surface portions facing in four cardinal directions being North, South, East and West,
        a first mirror surface on an inner surface of the North facing cylindrical surface portion,
        a second mirror surface proximate the circular bottom and the base and configured to reflect solar radiation upon the East, South and West cylindrical surface portions,
    spacer components in the base configured to form a space below the circular bottom that is enclosed by a bottom protective cover having venting grills and connections of the cold fluid inlet, the siphon overflow tube, the hot fluid outlet and the emptying tube, and this space is also used for installation of an electrical junction box and of a hot fluid outlet overpressure system powered by a photovoltaic panel installed over the top lid, and an inert gas charging valve fluidly connected to an enclosed space between the transparent top cover and the cylindrical central body and the dome-shaped top lid.

2. The solar fluid heater according to claim 1, wherein the cylindrical storage tank is mounted over a top face of the circular bottom having a lower thermal isolation layer attached thereto and wherein the tank comprises double concentrical walls with cylindrical thermal isolation, and wherein the cylindrical storage tank includes a top locking ring connected to an upper portion of the cylindrical central body.

3. The solar fluid heater according to claim 1, and further comprising a cold fluid supply system connected to the cold fluid inlet and comprising:
    a cold fluid inlet tube extending through the circular bottom and fluidly connected to a float valve, the float valve being connected to a float with a rod to actuate the float valve, wherein when the float is at a desired fluid level in the cylindrical storage tank, the float valve is closed and wherein when the float is below the desired level the float valve is opened,
    a guiding and protection tube configured to maintain the float in a correct position, and
    a deflector coupled to an outlet of the float valve configured to force cold fluid to remain in a lower portion of the cylindrical storage tank and maintain stratification due to different temperatures of fluid.

4. The solar fluid heater according to claim 1, wherein a hot fluid supply system comprises:
    a hot fluid outlet tube connected to the hot fluid outlet and extending through the circular bottom,
    a movable tube concentrically arranged over the hot fluid outlet tube having a diameter greater than the hot fluid outlet tube and an end with an opening, and
    a reversed hollow spherical cap attached to the end of moveable tube and configured to maintain the opening under a surface of the liquid in the cylindrical storage tank.

5. The solar fluid heater according to claim 1, wherein a balance and siphonic overflow system comprises:
    a main tube extending through the circular bottom and having an overflow opening configured to receive liquid at above a selected height in the tank and a vent opening configured to connect a top portion of an interior of the cylindrical storage tank with atmosphere, the main tube having a filter configured to inhibit entrance of impurities.

6. The solar fluid heater according to claim 1, wherein the transparent cover includes a sealing ring about a bottom portion of the cylindrical central body having elastic gaskets engaging each of an inner cylindrical portion of the transparent cover and the cylindrical central body, the sealing ring comprising clamping portions to compresses the elastic gaskets against the transparent cover and the central body.

7. The solar fluid heater according to claim 1, wherein the gap between the transparent cover the top lid and the cylindrical central body is a chamber with a valve configured to receive an inert gas, and a sensor disposed at an upper portion of the chamber configured to sense the inert gas when the chamber has been filled with the inert gas.

8. The solar fluid heater according to claim 1, wherein a top portion of the elastic membrane and a bottom portion of the elastic membrane are each secured to an inner surface of the cylindrical central body such that when the cylindrical storage tank is filled with fluid, the elastic membrane completely couples against an inner surface of the cylindrical central body.

9. The solar fluid heater according to claim 8, wherein the thermal interchange system further comprises check valves arranged to receive cold fluid, each check valve comprising a cylindrical valve body having on one of its end a sloping surface that works as a support for a hinged plate having a specific weight slightly higher than the liquid in which it is immersed.

10. The solar fluid heater according to claim 8, wherein the thermal interchange system further comprises check valves arranged to receive hot fluid, each check valve comprising a cylindrical valve body having on one of end a sloping surface that works as a support for a hinged plate having a specific weight slightly higher than the liquid in which it is immersed.

11. The solar fluid heater according to claim 1, and further comprising an electric backup system having electric resistors supported from an upper cross profile plate of the cylindrical storage tank, and wherein electrical connecting wires for the electric resistors extend the electrical junction box in the base through a central tubular member extending from the circular bottom to the upper cross profile plate.

12. The solar fluid heater according to claim 11, and further comprising a temperature sensor operably coupled to a microprocessor configured to control operation of the electric resistors.

13. The solar fluid heater according to claim 1, wherein the photovoltaic panel is disposed in the inert gas.

\* \* \* \* \*